Nov. 24, 1942.   R. E. ELLIOTT   2,303,033
DUMP TRUCK BODY
Filed Oct. 18, 1941   3 Sheets-Sheet 1
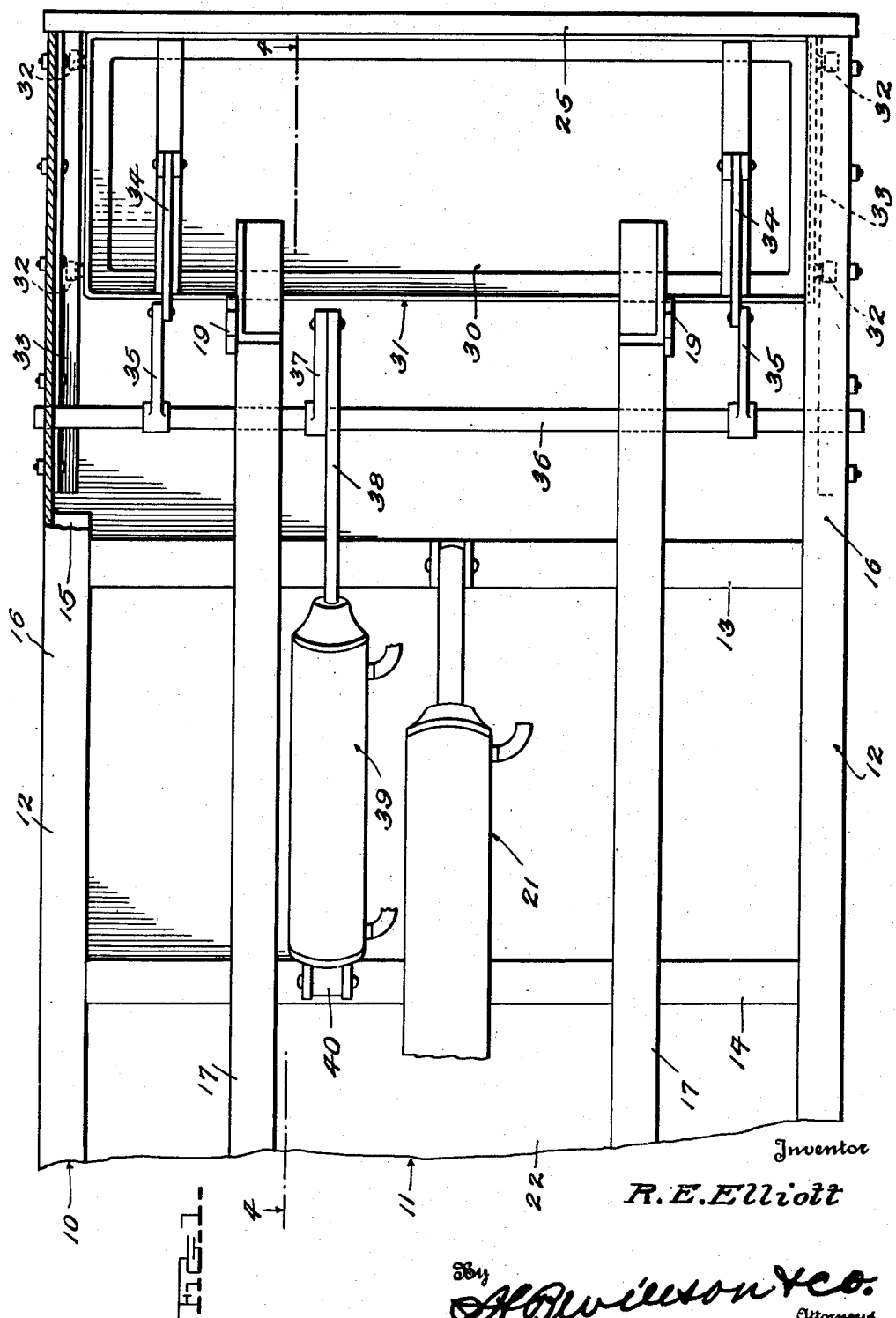
Inventor
R. E. Elliott
By H. Q. Wilson & Co.
Attorneys

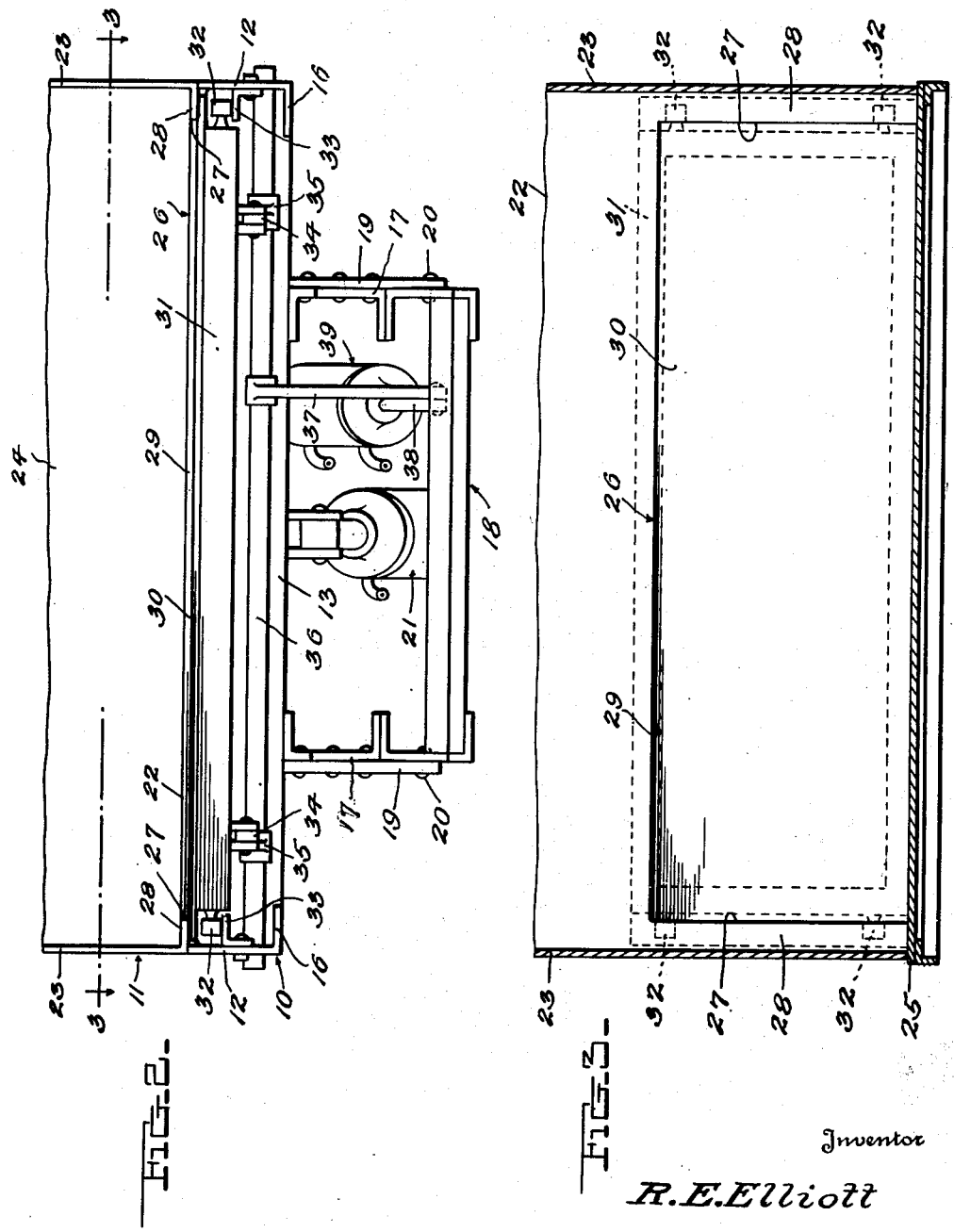

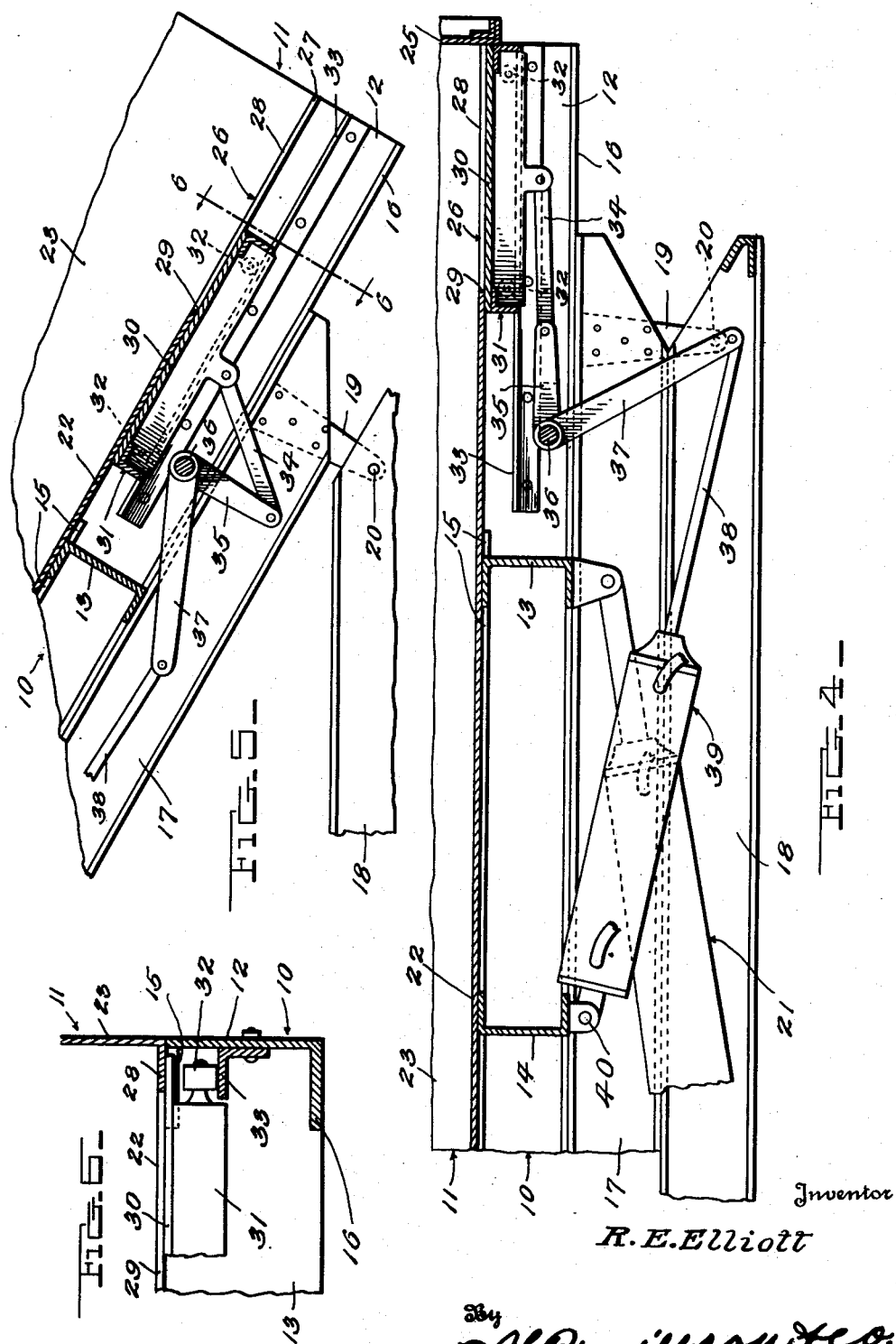

Patented Nov. 24, 1942

2,303,033

UNITED STATES PATENT OFFICE 2,303,033

DUMP TRUCK BODY

Roy Edgar Elliott, Fabens, Tex., assignor of one-half to William L. Summers, El Paso, Tex.

Application October 18, 1941, Serial No. 415,619

3 Claims. (Cl. 298—22)

The invention aims to improve upon the bodies of dump trucks in a novel manner which permits the load to be spread in a layer of desired thickness when dumping same, instead of dumping said load in one pile as now customary, and the invention further aims to make provision whereby unusually large rocks, large pieces of concrete, stumps, etc. may be given ample room to discharge from the dump body without the necessity of removing the usual pivotally suspended rearwardly swingable tail-gate.

A still further object is to provide a construction which may be expeditiously operated by hydraulic means suitably connected with the usual pump and reservoir of the hydraulic lift of the dump truck body if such a hydraulic lift be employed on the truck.

With the foregoing in view, the invention resides in the novel subject matter hereinafter described and claimed, description being accomplished by reference to the accompanying drawings.

Fig. 1 is a bottom view of a dump truck body including the improvements, the upper rear portion of the view being partly in horizontal section.

Fig. 2 is a rear elevation with the tail-gate removed.

Fig. 3 is a horizontal sectional view on line 3—3 of Fig. 2.

Fig. 4 is a vertical longitudinal sectional view on line 4—4 of Fig. 1, the slidable bottom section of the body being in closed position.

Fig. 5 is a fragmentary view similar to the rear portion of Fig. 4 but illustrating the body in a dumping position and illustrating the slidable bottom section partly opened.

Fig. 6 is an enlarged detail vertical section on line 6—6 of Fig. 5.

A preferred construction has been illustrated and will be specifically described, with the understanding, however, that within the scope of the invention as claimed, variations may be made.

The base frame 10 of the body 11 includes two parallel longitudinal side bars 12 and a plurality of transverse bars extending between and secured to said side bars, one of said transverse bars being shown at 13, spaced forwardly from the rear ends of the side bars 12, and another of said transverse bars being shown at 14, in advance of the bar 13. All of the bars 12, 13 and 14 are preferably metal channels and for later reference, the upper and lower inwardly projecting flanges of the side bars 12 are denoted at 15 and 16, respectively. The bars 13 and 14 are secured upon two longitudinal sills 17 which rest upon the side bars of the truck chassis frame 18, said sills having downwardly projecting brackets 19 at their rear ends which are pivoted at 20 to said chassis frame to permit the body 11 to be tilted to a dumping position under the influence of a hydraulic lift or the like 21.

The body 11 includes the usual metal bottom 22, side walls 23, front end wall 24, and pivotally suspended rearwardly swingable tail-gate 25 provided with suitable latch means (not shown). A notch 26, almost as wide as the bottom 22, is formed in the rear end of said bottom and extends entirely to the tail-gate 25, the longitudinal edges 27 of said notch being inwardly spaced from the side walls 23 to leave flange-like portions 28 of the bottom, projecting inwardly from said side walls as shown more particularly in Figs. 2 and 6. The front edge wall 29 of the notch 26 may well be substantially midway between the rear end of the bottom 22 and the transverse bar 13. While the bottom 22 is secured upon the top flanges 15 of the side bars 12, the rear portions of these flanges are cut away substantially from the bar 13 to the rear extremities of said side bars 12, thereby downwardly exposing the lower sides of the flange-like bottom portions 28 and the lower sides of the bottom portions of the body in advance of the notch 29. This is done to accommodate a slidable bottom section 30 which is provided to normally close the notch 26, said section 30 being in slidable contact with the lower side of the bottom 22 and its flange-like portions 28. This bottom section 30 is of rectangular form and is provided with a suitable carrying frame 31, said frame having rollers or other supporting shoes 32 at its ends. To support these rollers or shoes, longitudinal tracks 33, preferably of angle metal, are secured to the side bars 12 in upwardly spaced relation with their lower flanges 16.

The supporting frame 31 of the slidable bottom section 30 is connected by two links 34 with two arms 35 on the end portions of a transverse rock shaft 36 which extends between and is suitably supported by the side bars 12, said rock shaft being provided between its ends with a third arm 37 which is operatively connected with the piston rod 38 of a hydraulic cylinder and piston assembly 39, this assembly being mounted at 40 upon the transverse bar 14. By operating the assembly 39, the rock shaft 36 may be turned to open and close the slidable bottom section 30, as will be clear from a comparison of Figs. 4 and 5.

The fluid for operating the assembly 39 may well be moved by the conventional motor-driven pump which actuates the hydraulic lift 21, and a controlling valve may be provided in the cab of the truck, and it will be seen that said assembly 39 will require no additional fluid reservoir, the reservoir already provided for the hydraulic lift 21 being sufficient.

By opening the slidable bottom section 30 to the required extent, with or without the tail-gate 25 opened, the material being dumped from the body may be spread in a layer of desired thickness. Whenever unloading large rocks, pieces of concrete, stumps or the like which will not pass under the usual pivotal suspending means of the tail-gate 25, the bottom section 30 may be slid forwardly to the maximum, thus providing a greater space through which the rock or the like may discharge. It will thus be seen that the improved dump body herein disclosed possesses marked advantages over conventional dump bodies heretofore employed.

While preferred structural features have been illustrated, attention is again invited to the possibility of making variations within the scope of the invention as claimed.

I claim:

1. In a pump truck body, a horizontal base frame including two longitudinal side bars and transverse bars extending between and secured to said side bars, a bottom secured upon said longitudinal and transverse bars, the rear end of said bottom being provided with a notch, a slidable bottom section normally closing said notch, means mounting said bottom section on said side bars, a transverse rock shaft mounted on said base frame in advance of said bottom section and having two arms near its ends and a third arm between its ends, a cylinder and piston assembly mounted on one of said transverse bars and connected with said third arm for turning said rock shaft, and links connecting said two arms with said bottom section for operating the same.

2. A dump truck body comprising a horizontal base frame including two longitudinal side bars each having an upper and a lower inwardly projecting longitudinal flange, a bottom, side walls projecting upwardly from said bottom, and a tailgate cooperable with said bottom and side walls, said bottom being secured upon the two upper flanges of said side bars and having a notch opening through its rear end and almost as wide as said bottom, said notch having two longitudinal edges spaced inwardly from said side walls leaving flange-like portions of said bottom projecting inwardly from the lower edges of said side walls, a slidable rectangular bottom section normally closing said notch and contacting slidably with the lower side of said bottom, said bottom section having a front edge slightly in advance of said notch and having end portions slidably contacting with the lower sides of said flange-like portions of said bottom, supporting shoes on said end portions of said bottom section, two longitudinal tracks supporting said shoes and secured to the inner sides of said side bars above said lower flanges thereof, and means for sliding said bottom section forwardly to permit discharge of material through said notch with said tail-gate either open or closed.

3. A dump truck body comprising a horizontal base frame including two longitudinal side bars each having an upper and a lower inwardly projecting longitudinal flange, a bottom, side walls projecting upwardly from said bottom, and a tailgate cooperable with said bottom and side walls, said bottom being secured upon the two upper flanges of said side bars and having a notch opening through its rear end and almost as wide as said bottom, said notch having two longitudinal edges spaced inwardly from said side walls leaving flange-like portions of said bottom projecting inwardly from the lower edges of said side walls, the upper flanges of said side bars being cut off from the rear extremities of said side bars to points in advance of said notch, exposing the lower sides of said flange-like portions and the lower sides of the portions of said bottom in advance of said flange-like portions, a slidable rectangular bottom section normally closing said notch and contacting slidably with the lower side of said bottom, said bottom section having a front edge slightly in advance of said notch and having end portions slidably contacting with said exposed lower sides of said flange-like portions, supporting shoes on said end portions of said bottom section, two longitudinal tracks supporting said shoes and secured to the inner sides of said side bars above said lower flanges, and means for sliding said bottom section forwardly to permit discharge of material through said notch with said tail-gate either open or closed.

ROY EDGAR ELLIOTT.